May 4, 1926.

M. H. LOUGHRIDGE 1,583,061

EDUCATIONAL DEVICE

Filed July 5, 1922

2 Sheets-Sheet 1

Matthew H. Loughridge INVENTOR.

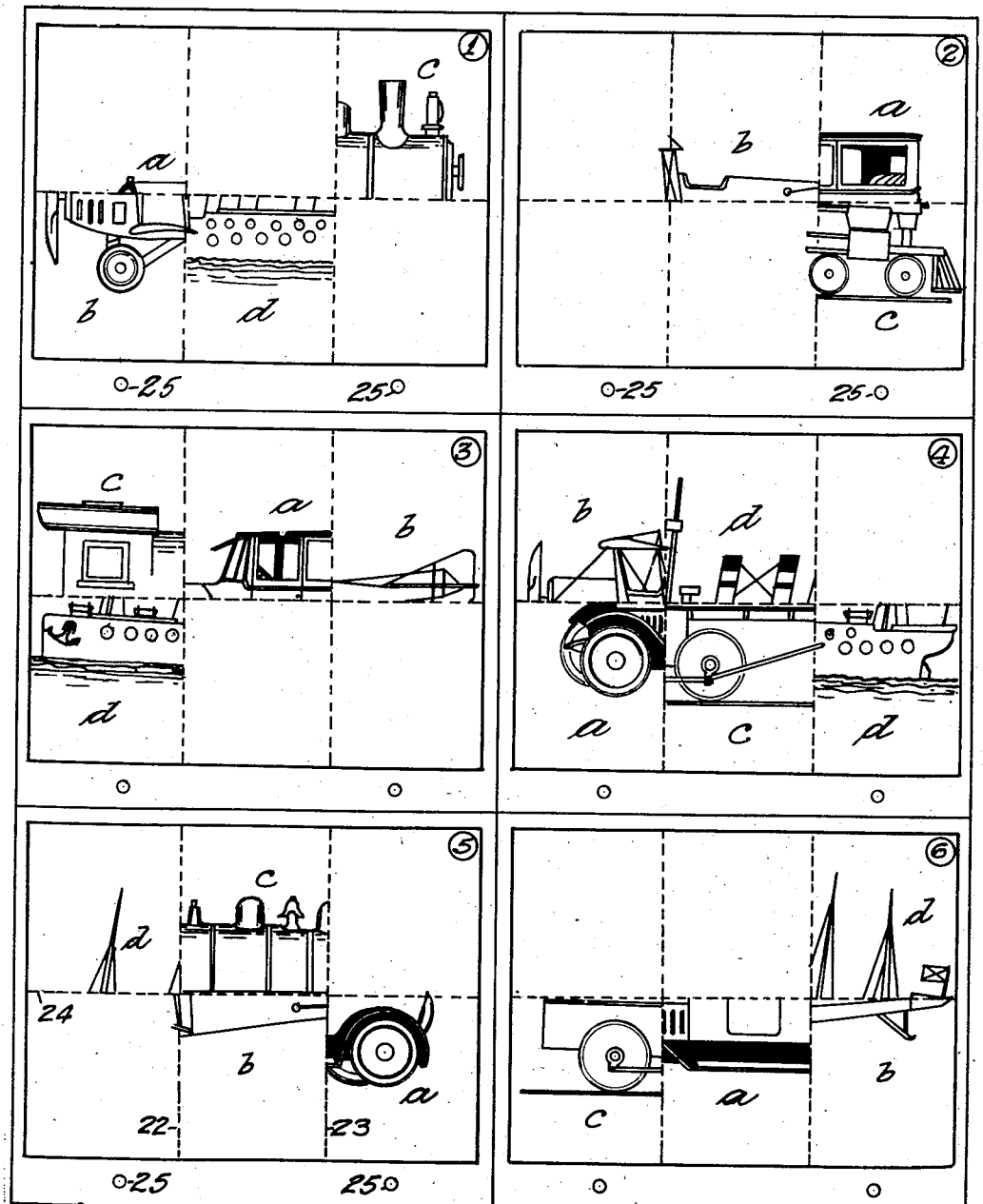

Patented May 4, 1926.

1,583,061

UNITED STATES PATENT OFFICE.

MATTHEW H. LOUGHRIDGE, OF BOGOTA, NEW JERSEY.

EDUCATIONAL DEVICE.

Application filed July 5, 1922. Serial No. 573,045.

*To all whom it may concern:*

Be it known that I, MATTHEW H. LOUGH-RIDGE, a citizen of the United States, and a resident of Bogota, in the county of Bergen and State of New Jersey, have invented certain new and useful Improvements in Educational Devices, of which the following is a specification.

This invention relates to an educational device or game which includes means of education by drawing certain familiar objects and, at the same time, is entertaining and amusing due to the novelty in the arrangement of the various parts. More particularly, this invention consists in a series of pictures relating to any particular subject, each divided into a number of parts. One or more of these parts are printed on a sheet and a number of these sheets are bound together in such a way that every part of each picture occupies the same position relative to the other parts of that picture on that sheet or on the other sheets as it occupies in the completed picture. That is, every part is so positioned that, when all the parts have been traced on a sheet of tracing paper held in fixed relation to the bound sheet or sheets, each part will match or register with the adjoining parts traced from following or preceding sheets and a complete picture will be obtained.

This invention is a development from and an improvement upon application, Serial No. 492,681, filed August 16, 1921, which shows an educational game consisting of sub-divided picture parts, spread in mixed relation upon a disk which rotates about a centre and may be positioned to enable a complete picture to be drawn from the various parts. In the present invention, no disks are required and no loose parts are necessary. This, however, secures most of the leading features disclosel in the application referred to in a very much less expensive arrangement which may be produced and published in book form, can be readily transmitted through the mails and forms an excellent advertising medium for certain products.

Figure 1:
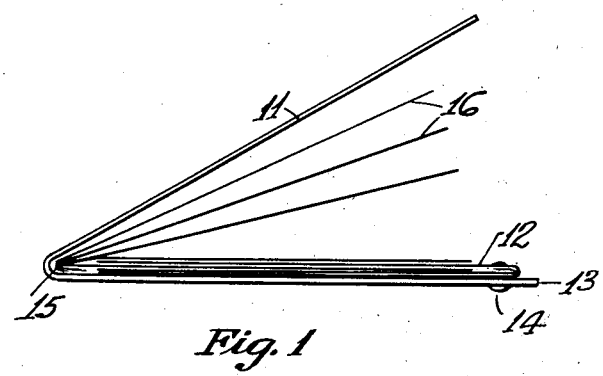
Figure 2:
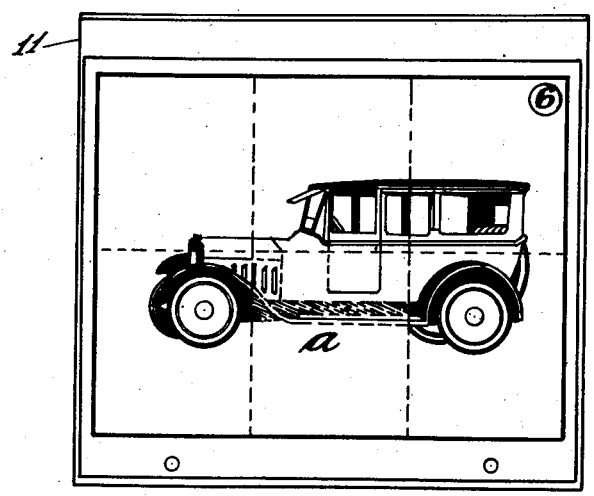

This invention will be more particularly understood from the following specification and the accompanying drawings in which Fig. 1 is an end elevation of the invention arranged in book form; Fig. 2 shows the results that may be obtained by the use of this invention and Fig. 3 shows in an elementary form how the picture subjects may be arranged.

In the application of this invention it is the intention that the picture subjects be arranged on separate leaves and bound together as indicated by the binder or cover 11, Fig. 1, binding the leaves 16 at 15. The cover may be opened like a book and each leaf turned over in the usual manner. On the outer end of the cover at 13 the tracing pad 12 is secured by the clips or other fasteners 14. It is preferable that this pad be detachably secured to the cover so that it may be removed when it has been used and a new pad substituted. It will be noted that the pad is attached at the opposite side from the leaves 16 and, therefore, each leaf of the pad may be turned back similarly to the leaves of a book and each leaf may be placed over any of the bound leaves 16. There is thus a fixed relation between the leaves of the tracing pad and the bound leaves 16 and if the bound leaves 16 with the picture parts thereon have been correctly registered, a part of a picture may be traced from each of the bound leaves on a single sheet of the pad and in this way a finished picture may be built up as shown in Fig. 2.

One way of arranging the picture subjects is illustrated in elementary form in Fig. 3, consisting of a sheet of paper stock 21, upon which six picture sheets are printed as indicated by the numerals 1 to 6. After printing, these sheets are cut apart on the vertical and cross lines as indicated and may be bound through the perforations 25 or may be made to register correctly on two edges at right angles and bound with a staple. Each sheet, it will be noted, is divided by dotted lines 22, 23 and 24, into six equal squares. This is illustrated in the present invention as a matter of convenience to show the principles of application and except in very elementary pictures would not be used in practice, as the parts of a picture may have any irregular contour and do not necessarily need to be the part included within one of the squares.

The pictures shown include an automobile, an aeroplane, a locomotive and a steamship, each divided into six parts. The blank spaces not used may be taken up by additional picture subjects. The letter $a$ has been used as an index mark for the parts of the picture making up an automobile; the letter $b$ is used as an index mark for the parts of the picture making up an aeroplane; the letter $c$ for the parts making up a locomotive; and the letter $d$, for the parts making up a steamship. The picture shown in Fig. 2 is an automobile developed from the parts indicated by $a$ in Fig. 3. This picture is sub-divided into squares corresponding to the squares in Fig. 3 so that the parts may be easily identified and the part $a$ from sheet 6 of Fig. 3 is not quite completed as indicated by the hatched lines.

From the foregoing description it will be apparent that when a set of sheets corresponding to Fig. 3 is correctly bound together and a sheet of tracing paper is provided in fixed relation to these bound sheets as indicated in Fig. 1, in order to draw an automobile, it is necessary to outline the part in square $a$ on sheet 1, the part in square $a$ on sheet 2 and similarly to outline the part in square $a$ on the remaining sheets until the automobile is completed. If a locomotive were desired, the part in square $c$ sheet 1 should be traced, then the parts in square $c$ sheet 2, and so on with the remaining squares indicated by the letter $c$ each part registering with the adjoining part to form a picture of a locomotive. In the same way an aeroplane may be drawn from the parts shown in squares $b$ and a steamship may be drawn from the parts shown in squares $d$. When used for advertising purposes, certain printed matter may be printed on the sheets of the tracing pad and while the user is tracing the picture, his attention is naturally centered upon the advertising matter, thus making the device attractive for advertising purposes.

For more advanced subjects such as geography, portrait work and animal study, it is desirable to use at least twelve bound leaves and of course any leaf may contain several component parts of a picture. For instance, if twelve bound leaves were used for the map of the United States, each leaf might contain four States, not necessarily adjoining, thus making up the forty-eight States of the country.

Having thus described my invention, I claim:

1. In a device of the class described, the combination of a plurality of bound leaves having parts of different pictures in mixed relation thereon, an identification mark for each part and a sheet of tracing paper held in fixed relation to said bound leaves whereby said sheet may be positioned over any leaf to enable a complete picture to be drawn from the various parts according to said identification marks.

2. In a device of the class described, the combination of a plurality of bound leaves having parts of a picture on each leaf, an identification mark for each part and a sheet of transparent stock held in fixed relation to said bound leaves and capable of being positioned over any leaf to enable a complete picture to be drawn on said transparent stock by tracing said parts.

3. In a device of the class described, the combination of a plurality of bound leaves having parts of different pictures on each leaf, identification marks characteristic to each picture for said parts and a sheet of transparent stock held in fixed relation to said bound leaves and capable of being positioned over any leaf to enable a picture to be drawn on said transparent stock by tracing the part having the same characteristic mark.

4. In a device of the class described, the combination of a plurality of bound leaves having parts of a picture on each leaf, said parts arranged on each leaf with relation to the position of the parts on the other leaves, a sheet of transparent stock held in fixed relation to said bound leaves and capable of being positioned over any leaf to enable a picture to be drawn by tracing said parts on each leaf on said transparent stock.

5. In a device of the class described, the combination of a plurality of bound leaves having parts of different pictures on each leaf, said parts arranged on each leaf with relation to the position of parts of the corresponding pictures on other leaves, an identification mark for each of said parts and a sheet of transparent stock held in fixed relation to said bound leaves and capable of being positioned over any leaf to enable a picture to be drawn on said transparent stock by tracing said parts according to said identification marks.

6. In a device of the class described, the combination of a plurality of bound leaves having parts of a picture on each leaf, a pad of tracing paper held in fixed relation to said bound leaves, each sheet of said pad capable of being placed over any of said bound leaves, whereby a complete picture may be traced on said tracing sheet from said parts.

7. In a device of the class described, the combination of a plurality of bound leaves having parts of a picture on each leaf positioned with relation to the parts of the same picture on other leaves, a pad of tracing paper held in fixed relation to said bound leaves, each sheet of said pad capable of being placed over any of said bound leaves and means enabling said parts to be drawn on said sheet in proper relation to each other.

8. In a device of the class described, the combination of a cover containing a plurality of bound leaves, a portion of a picture on each of said leaves positioned with relation to the other portions of the same picture on other leaves, a pad of tracing paper secured to said cover, each sheet of said pad capable of being placed over any of said bound leaves and means enabling said parts to be drawn on said sheet in proper relation to each other.

In testimony whereof I have affixed my signature.

MATTHEW H. LOUGHRIDGE.